Jan. 9, 1973     G. J. KAMINSKY ET AL     3,709,942
PREPARATION OF DIMETHYLHYDROXYLAMINE
Filed Sept. 30, 1970
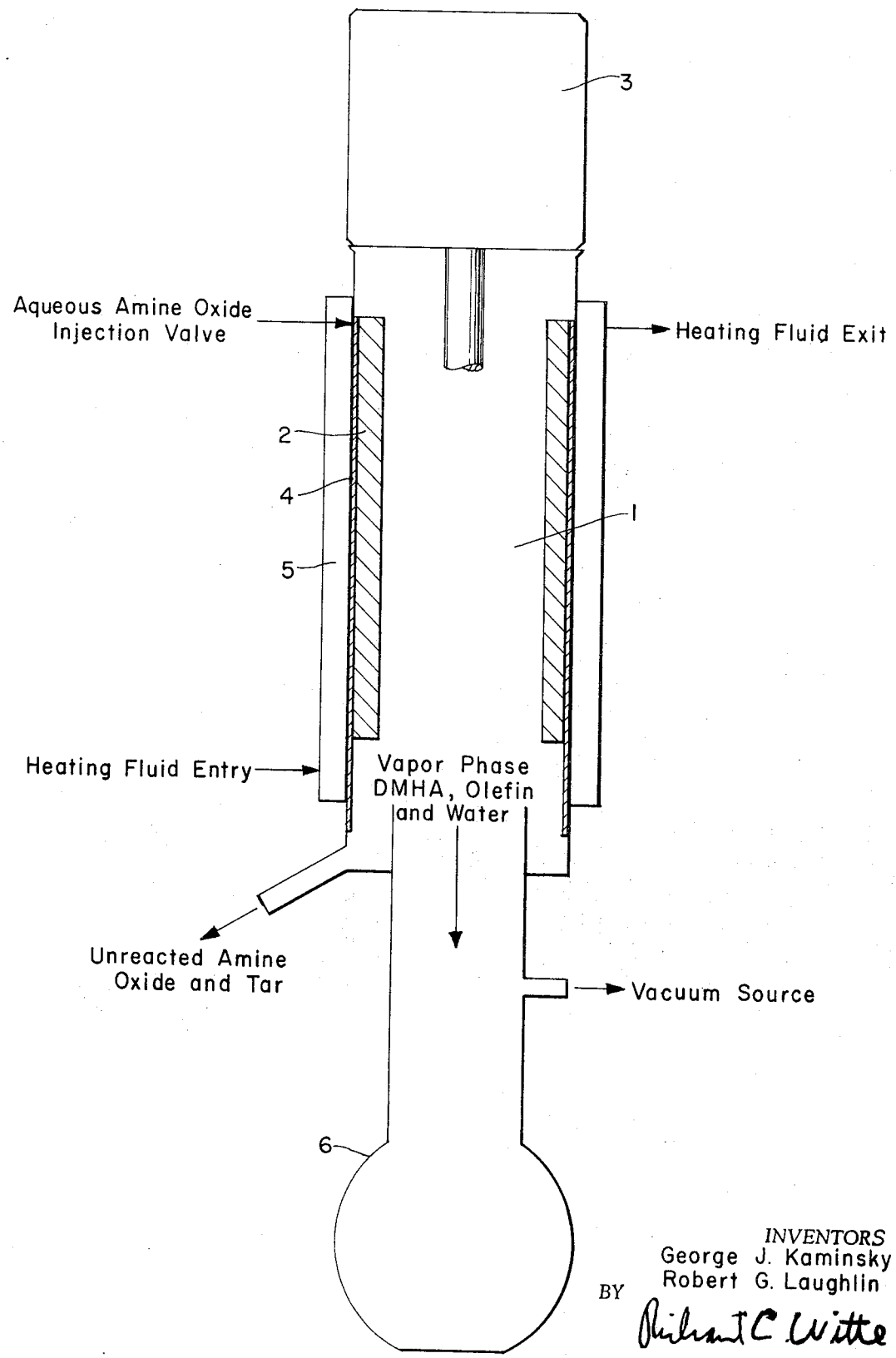
INVENTORS
George J. Kaminsky
Robert G. Laughlin
BY Richard C. Witte
ATTORNEY

United States Patent Office 3,709,942
Patented Jan. 9, 1973

3,709,942
PREPARATION OF DIMETHYLHYDROXYLAMINE
George J. Kaminsky, Cincinnati, and Robert G. Laughlin, Colerain Township, Hamilton County, Ohio, assignors to The Procter & Gamble Company, Cincinnati, Ohio
Filed Sept. 30, 1970, Ser. No. 76,843
Int. Cl. C07c 83/02
U.S. Cl. 260—583 DD       7 Claims

ABSTRACT OF THE DISCLOSURE

An improved process for the preparation and recovery of dimethylhydroxylamine by pyrolyzing aqueous alkyldimethylamine oxide. The pyrolysis is effected by injecting the aqueous amine oxide onto a heated reaction surface under reduced pressure, mechanically dispersing the amine oxide solution into a thin film over the reaction surface for pyrolysis, distilling the dimethylhydroxylamine and olefin pyrolysis products and separating the dimethylhydroxylamine. Dimethylhydroxylamine is useful in synthesizing 3-hydroxyalkyl surfactants and can also be used as a polymerization inhibitor.

BACKGROUND OF THE INVENTION

(1) Field of the invention

This invention relates to an improved process for the preparation and recovery of N,N-dimethylhydroxylamine. Such a compound is the reaction product, along with olefins, of the pyrolysis of alkyldimethylamine oxide having the general formula

wherein R is an alkyl or alkenyl radical of from about 8 to about 18 carbon atoms. The arrow in the formula is a conventional representation of a semi-polar bond. Pyrolysis is carried out under reduced pressure by dispersing aqueous solutions of the amine oxide on a wiped, heated surface. Recovery of the pyrolysis products can be effected by distillation. Aqueous dimethylhydroxylamine can be separated from the olefin-amine product mixture preferably by a double salting out procedure employing potassium carbonate or potassium fluoride.

(2) Prior art

Both dimethylhydroxylamine and its preparation by amine oxide pyrolysis are known in the art. (See Cope, "Organic Reactions," volume 11, pp. 361–3, Wiley, 1960.) In actual practice, however, formation of vapor phase pyrolysis products combined with the agitation necessary during bulk pyrolysis results in heavy foaming which renders such bulk pyrolysis completely impractical. Furthermore, if dimethylhydroxylamine is not removed from contact with the bulk reaction mass, it undergoes a secondary reaction with amine oxide which lowers the yield of dimethylhydroxylamine. Applicants' novel process improvement avoids these prior art difficulties, thereby markedly increasing dimethylhydroxylamine yield.

SUMMARY OF THE INVENTION

Briefly stated an improved method is provided for pyrolyzing aqueous amine oxide to dimethylhydroxylamine and olefin and for subsequent recovery of the dimethylhydroxylamine. Instead of bulk pyrolysis, applicants employ a process comprising the steps of injecting amine oxide solution onto a heated reaction surface, dispersing the aqueous amine oxide in a thin film over the reaction surface by means of a mechanical wiping system, removing pyrolysis products from the reaction surface by distillation and separating aqueous dimethylhydroxylamine by means of a potassium carbonate or potassium fluoride salting procedure.

BRIEF DESCRIPTION OF THE DRAWING

FIG. 1 represents a side view of one possible type of apparatus with which applicants' process improvement can be carried out. Amine oxide solution is injected through a needle valve onto the inner surface of a vertical cylindrical reaction vessel 1. The amine oxide solution is dispersed by a set (at least three) of vertical wiper blades 2 driven by a motor 3 placed at the top of the reaction vessel. Pyrolyzing amine oxide solution flows in a thin film 4 down the cylindrical reaction surface propelled by gravity. Pyrolysis temperature is maintained in the thin film by heating fluid such as silicone oil circulating through the heating jacket 5 surrounding the reaction chamber. A vacuum is maintained in the reaction vessel by a vacuum source which pulls vapor phase pyrolysis products and water injected with the amine oxide solution into a product recovery flask 6 which is chilled in a Dry Ice/solvent bath. Pressure in the reaction chamber for the system shown is maintained at approximately 12 mm. of Hg. Unpyrolyzed amine oxide is removed through an outlet at the bottom of the reaction chamber. Dimethylhydroxylamine is separated from the olefin pyrolysis product and water by a salting out procedure employing conventional laboratory equipment not shown. The physical apparatus illustrated in the drawing is not meant to limit applicants' invention to any partiular means of carrying out their process steps. The one embodiment shown in the drawing is included for illustration and clarification only.

DESCRIPTION OF THE INVENTION

This invention relates to an improved process for the preparation of dimethylhydroxylamine (DMHA). More specifically the invention relates to an improved process for pyrolyzing aqueous amine oxide by dispersing it under reduced pressure on a heated, mechanically wiped surface to form a film, with subsequent recovery of DMHA.

It is known that amine oxides having the general formula

wherein R is an alkyl or alkenyl radical of from about 8 to about 18 carbon atoms can be pyrolyzed as follows:

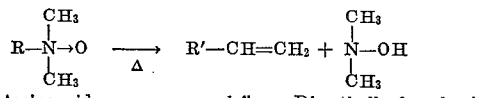

wherein R'—$CH_2$—$CH_2$—=R. Examples of amine oxides which undergo this reaction and which are operable in applicants' improved process include dimethyldodecylamine oxide, dimethyloctylamine oxide, dimethyldecylamine oxide, dimethyltetradecylamine oxide, and dimethylhexadecylamine oxide. Pyrolysis of the amine oxide takes place with the amine oxide in aqueous solution. Applicants' pyrolysis improvement employs aqueous amine oxide solution containing from about 15% to about 70% by weight amine oxide. The actual concentration of the amine oxide solution will depend upon the R chain length of the particular amine oxide or amine oxide mixtures employed. Octyldimethylamine oxide is very water soluble, and thus octyldimethylamine oxide solution pyrolyzed alone could contain as much as 70% amine oxide. This solution would contain just enough water to completely dissolve the octyldimethylamine oxide.

On the other hand, amine oxides used in this invention having longer alkyl chain lengths ($C_{16}$, $C_{17}$, $C_{18}$) require more water in which to completely dissolve. Octadecyldimethylamine oxide, for example is relatively water-insoluble. Thus solutions of the longer chain-length amine oxides will require higher water content. Fifteen percent by weight amine oxide is the approximate practical lowest amine oxide concentration at which commercial embodiments of applicants' invention would be operated. Coconut alkyl dimethylamine oxide (a mixture of amine oxides of different alkyl chain lengths corresponding to distilled coconut fatty alcohol, the approximate component distribution being $C_{10}$—0.5%; $C_{12}$—67.5%; $C_{14}$—24.5%; $C_{16}$—7.0%; $C_{18}$—0.5%) is preferably pyrolyzed in an aqueous solution containing from about 15% to about 35% by weight amine oxide.

Prior art processes employing bulk pyrolysis of the amine oxide solutions according to the above-described reaction are accompanied by several complicating factors which tend to decrease the DMHA yield. Bulk pyrolysis must always be carried out under agitation to insure uniform pyrolysis temperature throughout the reacting amine oxide solution. This agitation combined with the presence of much vapor phase olefin and DMHA produced by pyrolysis causes heavy foaming and bubbling in the reaction vessel. Such foaming severely impairs the efficiency of the pyrolysis reaction apparatus thereby lowering product yield.

In addition, after pyrolysis, the primary reaction product DMHA undergoes a secondary reaction with unpyrolyzed amine oxide, forming trialkylamine and an isoxazolidine. Occurrence of this side reaction naturally lowers the yield of DMHA.

Overall yield $$\left(\frac{\text{moles DMHA actually produced}}{\text{moles DMHA theoretically possible}} \times 100\%\right)$$

of DMHA from bulk pyrolysis of amine oxide is approximately 0%–20%.

Applicants have surprisingly discovered that yields of DMHA can be substantially increased, i.e., approximately doubled, by injecting aqueous amine oxide solution onto a heated surface and mechanically spreading and dispersing it into a thin film thereon. Creation of this thin film restricts actual pyrolysis to the layer of amine oxide contacting the heated reaction surface. This thin film has a thickness between about 0.0001 inch and 0.0200 inch. Olefin and DMHA are readily released from the thin film as they are formed.

Applicants' novel process serves to minimize the problems inherent in bulk pyrolysis which were outlined above. The wiping or dispersing step curtails foaming by eliminating the need for bulk agitation and by allowing vapor phase pyrolysis products to easily escape from the liquid amine oxide film without bubbling through a fluid mass. This quick release of olefin and DMHA from contact with the pyrolyzing film also restricts side reaction of the DMHA with unpyrolyzed amine oxide. Applicants have surprisingly discovered this secondary reaction to be the sole source of undesirable tertiary amine and isoxazolidine by-products.

Vapor phase pyrolysis products (DMHA and olefin) are quickly and continuously distilled from the reaction vessel surrounding the heated pyrolysis surface. Such distillation is effected by pulling the vapor products by vacuum through a cold zone and collecting the condensate. All the water which evaporated from the amine oxide solution during pyrolysis is also collected with the condensate. The condensate is in the form of a DMHA-water-olefin emulsion.

After distillation, DMHA can be recovered from the liquid pyrolysis product-water emulsion, preferably by a double salting out procedure employing potassium carbonate or potassium fluoride. Between 20% and 30% by weight of potassium carbonate or fluoride is first added to break the emulsion into an olefin and an aqueous DMHA phase. The olefin phase is physically withdrawn. A like amount of additional potassium carbonate or fluoride is then used to salt out DMHA into a distinct, salt free, DMHA-water phase. Vacuum distillation of the salt-free DMHA-water phase is employed to further concentrate the water-DMHA product. This second distillation step is not critical to applicants' invention.

Applicants have discovered that it is essential that the temperature of the heated reaction surface be maintained between about 150° C. and 250° C. Such a temperature limitation provides for maximum formation of DMHA. A preferred surface temperature is 210° C. The film is, of course, heated by supplying heat to the wiped reaction surface. This surface may be heated in any conventional manner such as with a jacket surrounding the reaction surface. Any conventional heat exchange medium may be employed in the reactor jacket.

Reaction vessel must also be carefully controlled. Reduced pressure in the reaction vessel facilitates rapid evaporation and distillation of the primary pyrolysis products—DMHA and olefins. However, highly reduced pressure also promotes rapid water evaporation which tends to remove heat from the pyrolyzing amine oxide film thereby lowering its temperature to the point at which undesirable amine oxide crystallization occurs. Very low pressure (down to 0.1 mm. of Hg) can be employed when the heat transfer characteristics of the reactor are such that the amine oxide film can be maintained at pyrolysis temperature in spite of water evaporation. For less-than-ideal systems, however, the lowest pressure which will not cause the amine oxide film temperature to drop to crystallization temperautre is preferred. This pressure will depend upon the heat transfer characteristics of the particular type of apparatus employed. For any given reaction vessel the preferred lower pressure is that pressure at which crystallization begins to occur. With these practical considerations, the lower the pressure, the better the yield of DMHA. Yields obtained by applicants' process become impractically low at reaction pressures above 100 mm. of Hg. Commercial embodiments of applicants' invention will thus probably operate within a preferred reaction vessel pressure range of from about 1 mm. of Hg to about 15 mm. of Hg.

The heated reaction surface employed in applicants' invention can be of any standard reactor material embodied in any suitable reaction vessel. Particular reactor materials and configuration are not critical to applicants' invention so long as some heated surface is provided which can be mechanically wiped. The reaction surface may be of any shape and in any convenient position.

A critical element of applicants' improved process is the step of mechanically wiping the heated reaction surface. As noted hereinbefore, the function of the wiping is to maintain a thin film of aqueous amine oxide spread over the heated surface. In addition to film dispersion, the wiping device may also be constructed to move or propel aqueous amine oxide through the reaction vessel which contains the heated surface. The usual wiping device consists of movable blades of some inert material (teflon, for example) which are propelled across the reaction surface and positioned in such a way as to leave a film of aqueous amine oxide thin enough for proper heat transfer and for ready escape of the vapor phase pyrolysis products. As noted above, film thickness may vary between 0.0001 inch and 0.0200 inch. The amine oxide solution is injected onto the heated surface in such a manner that the solution is placed in the path of the movable blades as they move across the reaction surface.

Injection rates of the aqueous amine oxide are not critical to applicants' invention. Such rates will depend upon the particular apparatus employed. Injection rate adjustments are governed by the necessity of maintaining the appropriate amine oxide residence time on the reaction surface, i.e., that residence time necessary to effect pyrolysis. Residence time in turn is dependent upon such variables as film thickness, reactor size and means of film propulsion (by gravity or by the wiping device or both). In short, injection rates for any given embodiment of applicants' invention are those which attain a desired thruput with minimal side reactions.

The following example serves to illustrate applicants' improved process.

EXAMPLE

A glass reactor is constructed from 54 millimeter glass tubing and outfitted with the motor, rotor and 3 teflon wiper blades from a two-inch molecular still, as shown in the drawing. Eighty-four millimeter glass tubing is used as a heating jacket through which silicone oil at 210° C. is circulated. This heated oil maintains the reaction surface temperature at about 210° C. Pressure in the reaction vessel is maintained at 12 millimeters of mercury.

Salt-free aqueous coconut alkyl dimethylamine oxide (28.8% amine oxide in water; "coconut" indicates that the amine oxide used was a mixture of alkyldimethylamine oxides wherein the alkyl groups have the following approximate distribution: $C_{10}$, 0.5%; $C_{12}$, 67.5%; $C_{14}$, 24.5%; $C_{16}$, 7.0%; $C_{18}$, 0.5%) is injected into the top of the vertical reactor at 140–160 grams per hour. The amine oxide solution is spread onto the reaction surface by the teflon blades being rotated at 440 r.p.m. Film thickness is approximately 0.010 inch.

As pyrolysis is carried out in the film, DMHA, olefin and evaporated water are distilled and collected in a flask at the bottom of the reactor, said flask being chilled in a Dry Ice/solvent bath to condense and freeze the mixture collected. The mixture is melted and kept below 40° C. to form a DMHA-olefin-water liquid emulsion. Twenty-five percent by weight of the total mixture of potassium carbonate ($K_2CO_3$) is added. This $K_2CO_3$ addition breaks the emulsion into an olefin phase and a DMHA-water-salt phase. The olefin phase is then removed with a separating funnel.

The same amount of $K_2CO_3$ is again added to the DMHA-water-salt phase to form a DMHA-water phase and a water-salt phase. Again the water-salt phase is physically removed.

Distillation of the DMHA-water phase (47–49° C./100–110 mm. of Hg) yields a mixture of DMHA and water which ranges from 80–88% DMHA by potentiometric titration with standard acid. The reactor is run for about 7 hours producing 30–35 gram per day of DMHA. Yields over many runs average 44%.

The wet DMHA is dried by adding it, with shaking and cooling in ice, to 3A molecular sieves (1/16″ pellets; 2.25 g. sieves/g. of water). After standing an hour or longer, the anhydrous DMHA is distilled in vacuo into a Dry-Ice cooled receiver. Purities of 99% are thus obtained. ]

DMHA can be oxidized in the presence of 1-olefins to form 2-methyl-5 alkylisoxazolidines having the formula

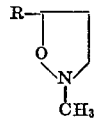

which can in turn be reduced to a 3-(hydroxyalkyl) methalamine of the formula

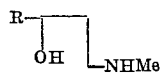

Such compounds are useful in the preparation of several types of surfactants. In addition, DMHA is useful as a polymerization inhibitor as disclosed in U.S. Pat. 3,148,225 and as a short-stopping agent for emulsion polymerization as disclosed in U.S. Pat. 3,222,334. Olefin produced and recovered in applicants' process is very clean and provides a useful byproduct.

What is claimed is:

1. In the process for the preparation of dimethylhydroxylamine by pyrolysis of an aqueous solution containing from about 15% by weight to about 70% by weight of an amine oxide having the general formula

wherein R is an alkyl or alkenyl radical of from about 8 to about 18 carbon atoms, the improvement comprising:
   (1) injecting said amine oxide solution onto a heated surface within a reaction vessel,
   (2) mechanically dispersing said amine oxide solution in a thin film of from about 0.0001 inch to about 0.0200 inch over said heated surface,
   (3) maintaining the temperature of the heated surface between about 150° C. and about 250° C.,
   (4) maintaining pressure in the reaction vessel between about 0.1 millimeter of mercury and about 100 millimeters of mercury,
   (5) distilling continuously olefin and dimethylhydroxylamine from the reaction vessel, and
   (6) separating dimethylhydroxylamine from the distilled olefin-aqueous amine mixture.

2. The process of claim 1 wherein the heated surface temperature is 210° C.

3. The process of claim 1 wherein the amine oxide is dimethyldodecylamine oxide and the amine oxide solution contains from about 20% to about 35% by weight dimethyldodecylamine oxide.

4. The process of claim 1 wherein the amine oxide is dimethyltetradecylamine oxide and the amine oxide solution contains from about 20% to about 35% by weight dimethyltetradecylamine oxide.

5. The process of claim 1 wherein the amine oxide is dimethylalkylamine oxide in which the alkyl group is a mixture of alkyl chain lengths corresponding to distilled middle cut coconut fatty alcohol; and wherein the amine oxide contains from about 15% to about 35% by weight of dimethylalkylamine oxide.

6. The process of claim 1 wherein separation of dimethylhydroxylamine is effected by salting the olefin-dimethylhydroxylamine product mixture with potassium carbonate or potassium fluoride.

7. The process of claim 5 wherein separation of dimethylhydroxylamine is effected by salting the olefin-dimethylhydroxylamine product mixture with potassium carbonate.

References Cited

UNITED STATES PATENTS 3,232,990  2/1966  Deger et al. _____ 260—583 DD
2,955,130  10/1960  Guyer et al. _____ 260—465.2

OTHER REFERENCES

Cope, et al.: Org. Reactions, vol. 11, 1960, pp. 361–365.

JOSEPH P. BRUST, Primary Examiner